June 18, 1968 C. J. KENNEDY 3,389,399

INCREMENTALLY AND CONTINUOUSLY DRIVEN MAGNETIC TAPE RECORDER

Filed Jan. 15, 1965 4 Sheets-Sheet 1

INVENTOR.
CHARLES J. KENNEDY

Charles J. Kennedy

INVENTOR.
CHARLES J. KENNEDY

Charles J. Kennedy

June 18, 1968 C. J. KENNEDY 3,389,399

INCREMENTALLY AND CONTINUOUSLY DRIVEN MAGNETIC TAPE RECORDER

Filed Jan. 15, 1965 4 Sheets-Sheet 3

INVENTOR.
CHARLES J. KENNEDY

Charles J. Kennedy

June 18, 1968 C. J. KENNEDY 3,389,399
INCREMENTALLY AND CONTINUOUSLY DRIVEN MAGNETIC TAPE RECORDER
Filed Jan. 15, 1965 4 Sheets-Sheet 4

INVENTOR.
CHARLES J. KENNEDY
Charles J. Kennedy

United States Patent Office 3,389,399

Patented June 18, 1968

3,389,399
INCREMENTALLY AND CONTINUOUSLY DRIVEN MAGNETIC TAPE RECORDER

Charles J. Kennedy, 266 E. Mendocino St., Altadena, Calif. 91001

Filed Jan. 15, 1965, Ser. No. 425,846
8 Claims. (Cl. 346—74)

ABSTRACT OF THE DISCLOSURE

A tape recorder is provided in which a stepping motor drives a capstan which engages a magnetic recording tape to record blocks of information bit position by bit position in synchronism with signals applied to a magnetic recording head and a continuously rotating capstan selectively engages the tape to transport the tape between blocks of information for a predetermined distance whereby a gap is introduced between blocks of digital information recorded on the tape.

This invention relates to magnetic tape recorders and more particularly to a new and improved incremental tape recorder including means for providing gaps or spaces between blocks of digital information recorded on a magnetic recording tape.

In assembling data from different sources for later use in a data processing system, it is well known to record binary coded digital information along the length of a magnetic recording tape with the successive groups of characters or numbers being recorded in blocks of information. One common format required by some digital computers is that the blocks of information be separated along the length of the tape by gaps or spaces. The information may be assembled from a source where the data appears at a slow or variable rate and recorded on the tape for later presentation to a digital computer at a relatively high rate of speed. In particular, where the information occurs at a relatively slow or variable rate of speed it is known to record information on the magnetic recording tape by means of incremental recording. In incremental recording, the tape is stepped along past the magnetic recording head one bit position at a time, with the stepping of the tape being synchronized with the appearance of the digital signals for recording. By this means, the tape recorder is adapted to operate over a wide range of recording speeds with a tape being prepared in which the pattern of information appearing on the tape is uniform, irrespective of the rate at which the information appeared from the source. As the information is recorded digit by digit and the incremental drive system of the recorder steps the tape along one binary digital bit position at a time, a block of information containing a predetermined number of characters is recorded on the tape.

In order that the information on the tape may be arranged in a suitable format with gaps or spaces between the blocks of information, it has been known to interrupt the recording of the information and to increase the speed of the incremental drive so as to step off a gap between the blocks. However, during the formation of the gap, information being presented to the recorder is lost unless auxiliary storage is provided to hold the information until the tape has been transported to a position succeeding the gap where it may accept a new block of information. Therefore, it is desirable that the time required to form the gap or space be minimized. However, in conventional arrangements in which the formation of the gap is provided by an increase of speed in the incremental drive, a serious time limitation is imposed which leads to an inevitable loss of information or requirement for extensive auxiliary information storage facilities.

Another problem which arises in incremental tape recorders occurs where a relatively fast wind and rewind function is required since the incremental drive cannot be stepped fast enough to enable a lengthy magnetic recording tape to be transported rapidly in the recorder to a desired location on the tape.

It has in the past been known to provide tension arms or vacuum columns or the like which provide a buffering action between the supply and takeup reels and the area where recording proceeds to accommodate fast stops and starts. These tension arms may be connected to servo systems which control the supply and takeup reel drive motors in such a way as to maintain tape tension between the two tension arms at an appropriate level. However, upon a rapid rewind operation as one reel becomes progressively less full and the other one becomes more full, it becomes necessary for one of the drive motors to operate at a lower speed than the other. It has been found in such arrangements that independently operating servo systems on the supply and takeup reels produce a difference in tape tension during a fast rewind operation which causes the tape to be improperly wound upon the reel. It is therefore an object of the present invention to provide an improved magnetic tape recording system for recording data in a computer compatible format as synchronously presented data.

Another object of the present invention is to provide an improved magnetic tape recording and reproducing system capable of operating both asynchronously and synchronously.

A further object of the present invention is to provide an improved arrangement for controlling a recording system so as to provide increased reliability and performance.

Another object of the present invention is to provide a new and improved incremental tape recorder having means for introducing a gap between blocks of digital information.

It is another object of the present invention to provide a tape recorder in which gaps may be provided between blocks of recorded digital information with minimum information loss.

It is yet another object of the present invention to provide a new and improved incremental magnetic tape recorder which may perform rapid wind and rewind operations.

It is yet another object of the present invention to provide an incremental magnetic tape recorder in which the tension of the tape is controlled to insure that the tape is properly wound upon the supply and takeup reel.

These and other objects are achieved by systems in accordance with the invention which include means for stepping a magnetic tape in synchronism with asynchronously supplied input data, and means for separately driving the magnetic tape at a continuous high speed for a controlled interval. With this arrangement, the tape may be driven incrementally, one frame at a time, as successive characters are provided asynchronously, and the stepping operation may be terminated with the continuous advance being introduced in a timed relation, in order to insert a standard inter-record gap without substantial delay.

In accordance with one aspect of the invention, the tape is driven by a first capstan operated from a stepping motor, through the action of a pinch roller engaging the tape against the capstan. A continuously rotating second capstan and associated pinch roller are positioned along the tape path at a point spaced apart from the incrementally movable capstan with the pinch roller for the continuously rotating capstan being normally held out of engagement as the incremental stepping action is carried out. As the end of a block of characters is reached, a longitudinal check character may be inserted, if desired, and a standard inter-record gap is then inserted by actuation of the pinch roller for the continuously rotating capstan in substantial concurrence with the release of the pinch roller for the incremental stepping capstan. The pinch roller for the continuously rotating capstan is held engaged for a predetermined time interval, thus defining the inter-record gap distance. It is found that this arrangement provides substantially constant stepping of the tape, as well as close control over the inter-record gap distance with the latter being developed with minimum interruption of the normal step and record operation. Another feature of systems in accordance with the invention derives from the fact that the dual capstan arrangement permits synchronous recording and reproduction, for higher data transfer rates. This data may be recorded synchronously, and reproduced synchronously, or the tape may be driven at a relatively high rate of speed in a search mode, and thereafter operated synchronously or asynchronously as desired.

Another aspect of systems in accordance with the invention relates to coordination of the operation of the various mechanisms during various modes of operation. The pinch roller actuating mechanisms are interlocked, such that they do not engage the tape to their respective capstans at the same time. A further aspect of the invention is that movable arm compliance mechanisms provide variable tape lengths between the tape drive mechanism and the respective tape reels, and that the servos for these movable arm compliance mechanisms are intercoupled. Thus, when the tape is driven in one direction at maximum speed, and a given reel motor is operating at a maximum capacity, a signal indication is provided to the servo for the other reel motor, to maintain proper speed and tension relations between the two reel drive systems.

A better understanding of the invention may be gained from a consideration of the following detailed description, taken in conjunction with the accompanying drawings, in which.

Figure 1:
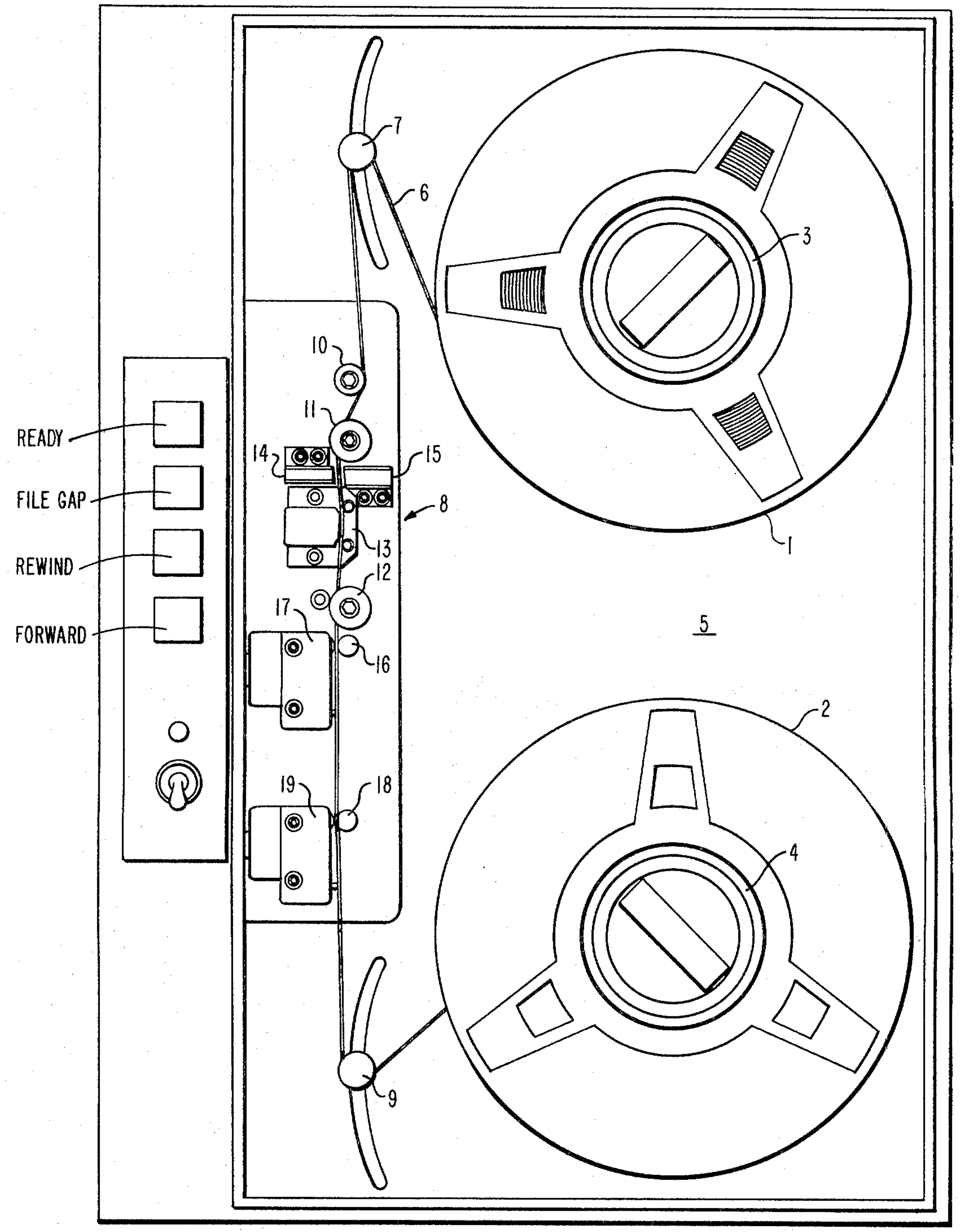
FIG. 1 is a front view of a particular magnetic tape recorder in accordance with the invention.

In the magnetic recorder as shown in FIG. 1, there appears a tape supply reel 1 and a takeup reel 2. Each of the reels 1 and 2 is mounted on a hub 3 and 4, respectively. The hubs 3 and 4 are rotatably supported on a relatively heavy support frame plate 5 of the recorder. A magnetic recording tape 6 follows a traverse from the supply reel 1 to the takeup reel 2 over an upper tension arm 7, through a recording zone 8, and around a lower tension arm 9 to the takeup reel 2. Within the recording zone 8 the path of the tape is determined by channeled tape guides 10, 11 and 12. Positioned between the tape guides 11 and 12 is a multiple track magnetic recording head 13. The components positioned between the magnetic recording head 13 and the tape guide 11 comprise photocells 14 and 15 which sense reflective strips placed upon the tape for control of machine functions which are not related to the present invention and, hence, will not be described in further detail. Below the tape guide 12 in FIG. 1 is an incremental drive capstan 16 and a first solenoid actuated pinch roller mechanism 17. Below the incremental drive capstan 16, a continuously rotating capstan 18 is positioned adjacent the path of the tape along with a second solenoid actuated pinch roller mechanism 19. The capstans 16 and 18 are journaled in the support plate 5 and are driven respectively by a stepping motor 20 and a continuously rotating synchronous motor 21 (see FIG. 2).

In operation, electrical signals are applied to the magnetic recording head 13 which operates to record the signals on the tape 6 in the form of residual magnetism. The stepping motor 20 drives the capstan in synchronism with the appearance of digital signals at the magnetic recording head 13. Thus, the stepping motor may advance its motor one step or 18° at a time, which may be converted to a suitable spacing on the tape, such as .005 inch, through appropriate gearing. The continuously operating synchronous motor 21 may be arranged so that its rotational speed, when taken in combination with the diameter of its capstan, is capable of advancing the tape at 30 inches per second. In operation during recording, the solenoid of the pinch roller mechanism 17 is actuated so as to press the tape 6 into engagement with the stepping motor capstan 16. Thus, as the stepping motor advances step by step, increments of the tape 6 are drawn past the magnetic recording head 13 with data signals being recorded on the tape in sequence. The rate at which the data signals are recorded may vary over a wide range so that the machine is capable of preparing a tape in accordance with the availability or production of data suitable for recording.

Upon the recording of a predetermined number of characters on the tape as may be determined by logic circuits external to the tape recorder, a signal is provided which disengages the solenoid of the pinch roller mechanism 17 to release the tape from the incremental drive capstan 16. The solenoid actuated pinch roller mechanism 19 may then be actuated to engage the tape with the continuously rotating capstan 18. Since the rate of rotation of the continuously rotating capstan 18 is relatively high compared to the incremental drive capstan 16, a section of the tape is rapidly drawn past the magnetic recording head 13 thereby introducing a gap between blocks of recorded information. By controlling the time interval for which the solenoid actuated pinch roller mechanism 19 is engaged, the length of the gap produced upon the tape 6 may be determined. In a typical arrangement, the requisite gap for placing the tape in the proper format for introduction to a computer is approximately three-quarters of an inch with the continuously rotating capstan 18 operating to produce a nominal tape speed of 30 inches per second, the resultant time interval for the energization of the solenaid actuated pinch roller mechanism 19 may be approximately 28 milliseconds. Longer gaps may of course be introduced, as for example where it is desired to introduce what is called a file gap between one series of blocks of information recorded on the tape and another series of blocks of information. In this case, the time interval for which the solenoid actuated pinch roller mechanism 19 is actuated may be of the order of 105 milliseconds which in turn may be expected to produce a gap of approximately 3½ inches. In particular arrangements to adapt the tape recorder for use in conjunction with specific computers requiring particular formats there may, of course, be introduced into the gap, or just preceding the gap, certain longitudinal parity check indicia in conventional fashion. Thus, in one particular arrangement, circuitry is provided for rapidly stepping the tape at the end of each block by a sequence of four steps with there being recorded on the tape a longitudinal parity check upon the occurrence of the fourth step.

Figure 2:
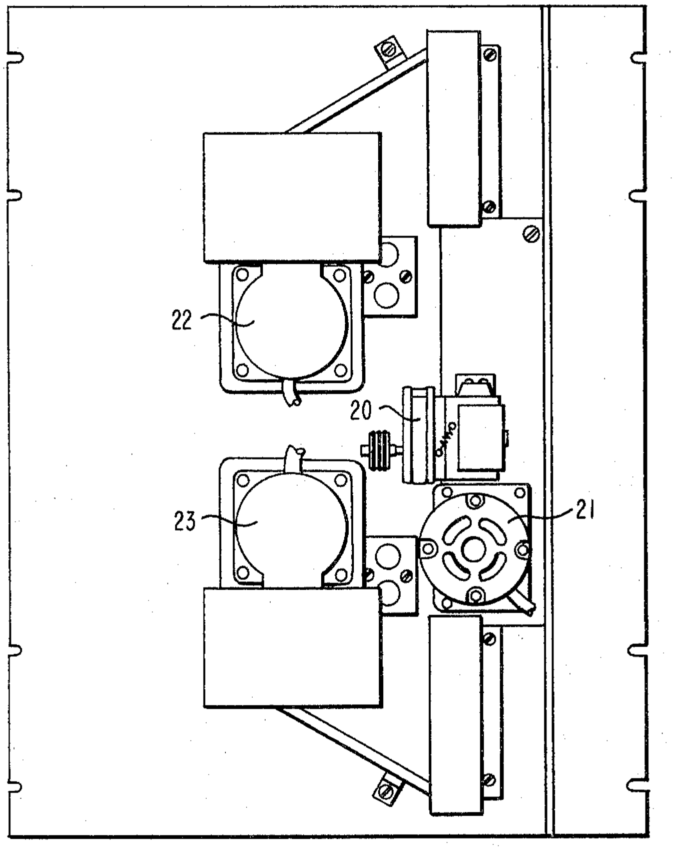
FIG. 2 is a simplified rear view of the magnetic tape recorder of FIG. 1.

In order to provide a fast forward wind operation in the magnetic tape recorder of FIGS. 1 and 2, the solenoid actuated pinch roller mechanism 17 should be disengaged so as to release the tape from incremental drive capstan 16 while at the same time the solenoid actuated pinch roller mechanism 19 should be actuated to engage the tape with the continuously rotating capstan 18. By maintaining the solenoid actuated pinch roller mechanism 19 actuated, a rapid forward wind operation may be achieved at approximately the speed of the continuously operating capstan 18 which may be, for example as described above, 30 inches per second. During incremental drive operation and fast gap producing operation, as well as in the fast forward wind operation, the reels 1 and 2 are controlled by servo systems to maintain a proper tape tension between the tension arms 7 and 9 and to supply tape to the recording zone 8 and to take up tape from the recording zone 8 at an appropriate rate. This is accomplished as will be described in more detail below by means of a separate null balance servo system for each of the reels 1 and 2 which receives an input signal corresponding to the positions of the tension arms 7 and 9. Thus, a deflection of the tension arm 7 upwardly indicates that too much tape is being supplied to the recording zone 8 and a servo motor 22 (FIG. 2) coupled to the hub 3 of the tape supply reel 1 is controlled to slow down slightly so as to increase the tape tension and to return the tension arm 7 to its proper null position. In contrast when the tension arm 7 is deflected downwardly the servomotor 22 is caused to increase speed slightly so as to supply more tape and therefore enable the servo arm 7 to rise until is reaches its null position. In similar fashion the servo system controls the takeup reel 2 so that upon deflection of the tension arm 9 upwardly or downwardly a servomotor 23 (FIG. 2) coupled to the hub 4 is caused to decrease or increase speed respectively to return the arm 9 to its null position.

Figure 3:
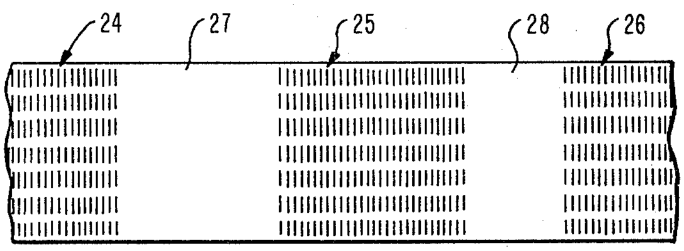
FIG. 3 is a diagrammatic illustration of the recording pattern which appears on a strip of magnetic recording tape produced by the magnetic tape recorder of FIGS. 1 and 2 and in accordance with the invention.

Accordingly, throughout the operation of the recorder as described thus far, the servo systems function to supply and retrieve an appropriate amount of magnetic recording tape at an appropriate tension during incremental recording operations, fast gap operations, and fast rewind operations with transitions between the various operations being accommodated by a momentary deflection of the tension arms 7 and 9 followed by an appropriate adjustment of the supply and takeup reel rotational speeds under the control of a servomechanism to restore the supply and takeup functions to a stable operation in which the arms 7 and 9 are returned to null balance position. The operation of recording a block of information and of developing a gap between blocks may be observed from the diagrammatic illustration of FIG. 3 wherein a section of tape is represented as including blocks of information separated by inter-block gaps. As previously described, blocks of information may contain any desired number of characters. Thus in FIG. 3 blocks 24, 25 and 26 are shown which are separated respectively by the gaps 27 and 28. Due to the fact that in the arrangement of FIGS. 1 and 2 the production of the gaps 27 and 28 may take as little as 28 milliseconds, it may be seen that the rapid production of a gap in the manner described leads to a minimization of the loss of digital information, and where such loss is important a minimum amount of auxiliary storage is needed to store temporarily the information which arrives during the gap time interval for later presentation to the recorder.

Figures 4, 5:
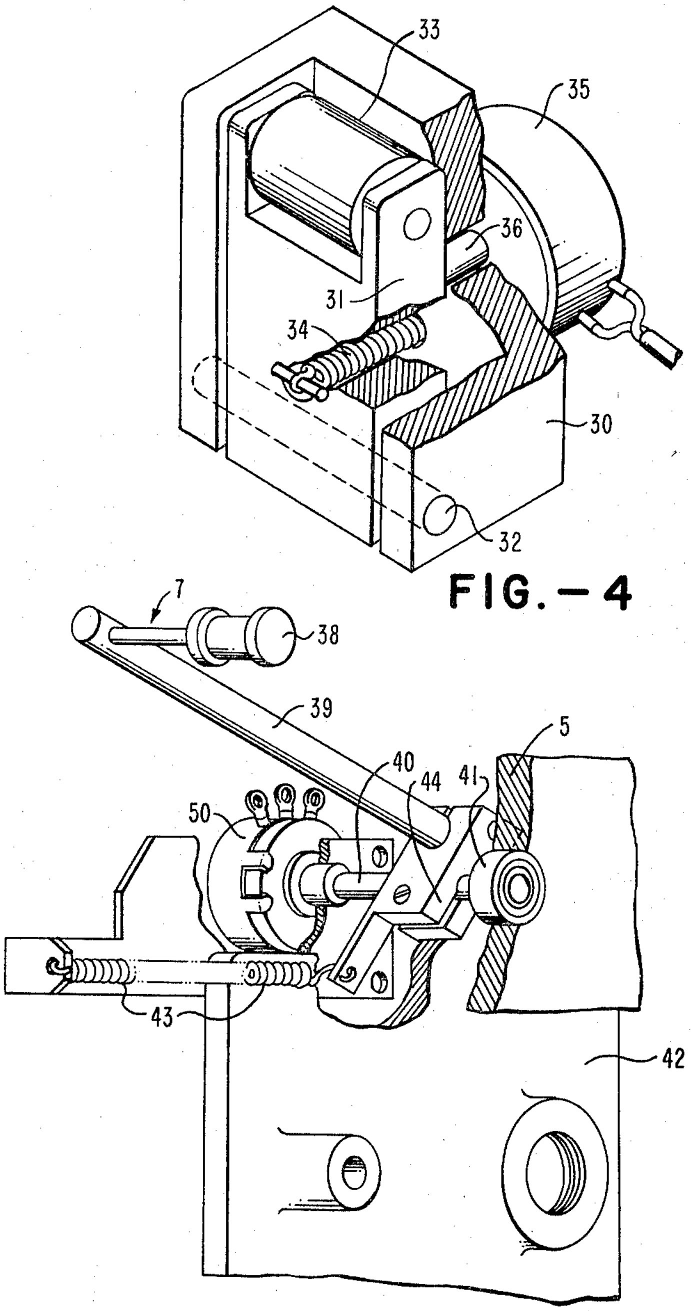
FIG. 4 is a perspective view, partially broken away, of one suitable solenoid actuated pinch roller for use in the magnetic tape recorder of FIGS. 1 and 2.
FIG. 5 is a perspective view, partially broken away, of one of the tension arm mechanisms employed in the magnetic recorder of FIGS. 1 and 2.

FIG. 4 illustrates one arrangement of a solenoid operated pinch roller mechanism for use in conjunction with the recorder of FIGS. 1 and 2 either for the pinch roller mechanism 17 associated with the incremental drive capstan 16 or the pinch roller mechanism 19 associated with the continuously rotating capstan 18. In FIG. 4 there is shown a housing 30 which carries a yoke 31 which is pivotally mounted on a pin 32. The yoke 31 bears the pinch roller 33 and function to engage the tape with the capstan as described above. The yoke 31 is spring loaded away from the tape by means of a spring 34 so as to maintain the pinch roller 33 out of engagement with the tape except when the solenoid actuated pinch roller mechanism is energized. In order to actuate the pinch roller a solenoid 35 is attached to the housing 30 and when energized provides an extension of a shaft 36 which thrusts the yoke 31 outwardly to engage the pinch roller 33 with the tape so as to press the tape into engagement with the adjacent capstan. Therefore whenever the solenoid 35 is actuated the tape may be engaged with the adjacent capstan so as to achieve a desired operation as above in connection with incremental recording, a fast gap operation, or a fast wind operation.

The manner in which the tension arms 7 and 9 operate to produce an electrical signal to control a servo system for the control of the speed of the supply and takeup reels 1 and 2 may be understood from the partially broken away perspective view of FIG. 5 showing one such tension arm, which by way of example is the upper tension arm indicated generally as 7 in FIG. 1. The tension arm 7 comprises a channeled tape guide 38 which is connected to a rod 39. The rod 39 is rotatably supported upon the shaft 40 of a potentiometer 50 by means of a clamp 44. In order to support the tension arm the shaft 40 may be journaled as by means of a bearing 41 in the front plate 5 of the recorder. The potentiometer 50 may be mounted in a back plate 42 which is spaced away from the front plate of the recorder. The channeled tape guide 38 of the tension arm 7 extends through the front plate 5 via a slot therein as shown in FIG. 1. In a similar fashion the lower tension arm 9 is constructed so as to enable the tension arm to move up and down by being connected through a similar slot in the front plate 5. In any event, a movement up or down of the channeled tape guide 38 causes the rod 39 to rotate the shaft 40 of the potentiometer 50. In the case of the tension arm 7 the channel tape guide 38 is urged upwardly by a spring loading of the mechanism in a clockwise direction by means of a coil spring 43 connected between the clamp 44 and a fixed location on the plate 42. In a similar fashion, the tension arm 9 of FIG. 1 would be generally spring loaded in a counterclockwise direction so as to present a tension to the tape between the tension arms 7 and 9.

In operation, a movement of the tension arm 7 or 9 produces a consequent turning of the shaft 40 of the associated potentiometer 50 so that an electrical signal may be derived from the potentiometer terminals corresponding to the position of the tension arm. These electrical signals are applied to a servo system which in turn controls the operation of the servomotors 22 and 23 to cause the supply and take up reels 1 and 2 to provide an amount of tape which will enable the tension arms to reach and maintain a substantially null balance position.

Figure 6:
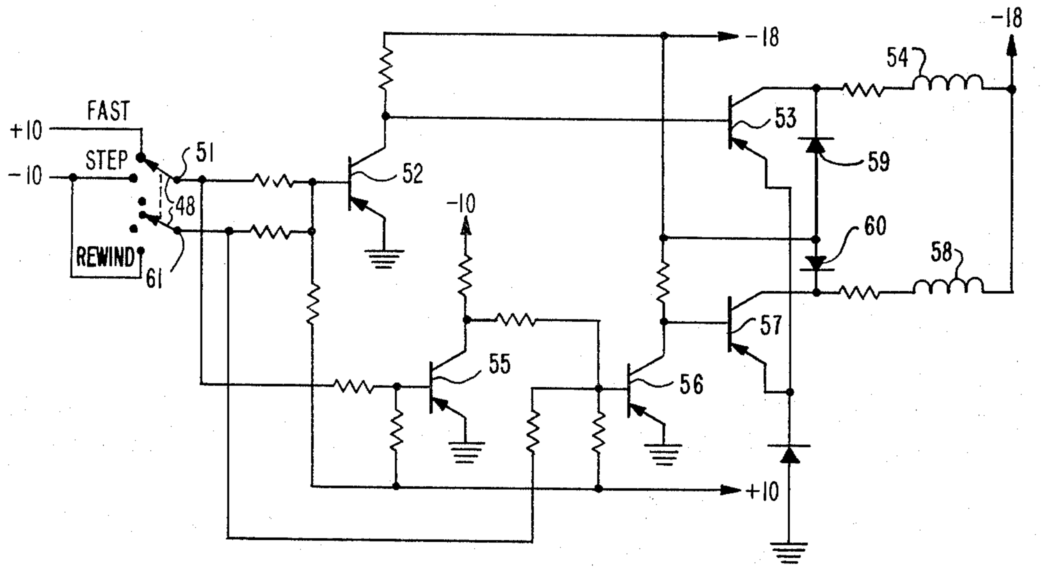
FIG. 6 is a schematic circuit diagram of one suitable arrangement for controlling the pinch roller solenoid of the magnetic recorder of FIGS. 1 and 2.

In FIG. 6 there is shown a schematic circuit diagram of an arrangement for energizing the solenoid actuated pinch roller mechanisms 17 and 19 of the tape recorder of FIGS. 1 and 2. In the diagram of FIG. 6, a signal applied to the terminal 51 is passed to a two-stage transistor amplifier comprising the transistors 52 and 53 and thence to the solenoid coil 54 associated with the solenoid actuated pinch roller mechanism 19 for producing a fast transport of the tape. The same signal from the terminal 51 is passed via a three-stage transistor amplifier comprising the transistors 55, 56 and 57 to the coil 58 of the solenoid associated with the stepping motor pinch roller mechanism 17 of FIG. 1. Since the signal associated with the fast pinch roller solenoid coil 54 passes through a two-stage amplifier and the signal applied to the step pinch roller solenoid coil 58 passes through a three-stage transistor amplifier, the signals at the coils 54 and 53 are of opposite polarity. Therefore, if a negative voltage is applied to the terminal 51 it appears as a negative voltage across the fast pinch roller solenoid coil 54 and as a positive voltage across the step pinch roller solenoid coil 58. Since the coils 54 and 58 are returned to a relatively negative source, the result of a negative input signal is that the step pinch roller solenoid coil 58 is energized while the fast pinch roller solenoid coil 54 is not energized. Similarly, when a positive voltage is applied to the terminal 51, the fast pinch roller solenoid 54 receives an actuating voltage while the step pinch roller solenoid coil 58 is not actuated. Each of the transistors 52, 53, 55, 56 and 57 is appropriately biased by means of resistors with a suitable source of voltage and the diodes 59 and 60 are included to protect the transistors from surges of inductive voltages which may appear across the solenoid coils 54 and 58 upon cutoff of current therethrough. The terminal 61 is adapted to receive a suitable voltage for application to the two-stage amplifier comprising the transistors 52 and 53 and is applied to the base of the transistor 56 (bypassing the transistor 55) so as to convert the lower amplifier into a two-stage amplifier. By this means, a negative voltage at the terminal 61 may be applied simultaneously to the fast pinch roller solenoid coil 54 and the step pinch roller solenoid coil 58, thereby to insure that neither coil is actuated during a rewind operation which is controlled solely by the operation of the servomechanisms associated with the reels 1 and 2 as described in detail below. Therefore, by applying suitable voltages to the terminals 51 and 61 there may be achieved by means of the circuit of FIG. 6, insofar as the recording zone is concerned, a fast gap operation, a fast wind operation, a step operation, or a rewind operation. For purposes of illustration, the voltages for the terminals 51, 61 are shown derived by a switch 48 having positions for fast, step and rewind operation. It will be understood, however, that the voltages may be received from preceding driver stages arranged to generate the appropriate signals electronically.

Figure 7:
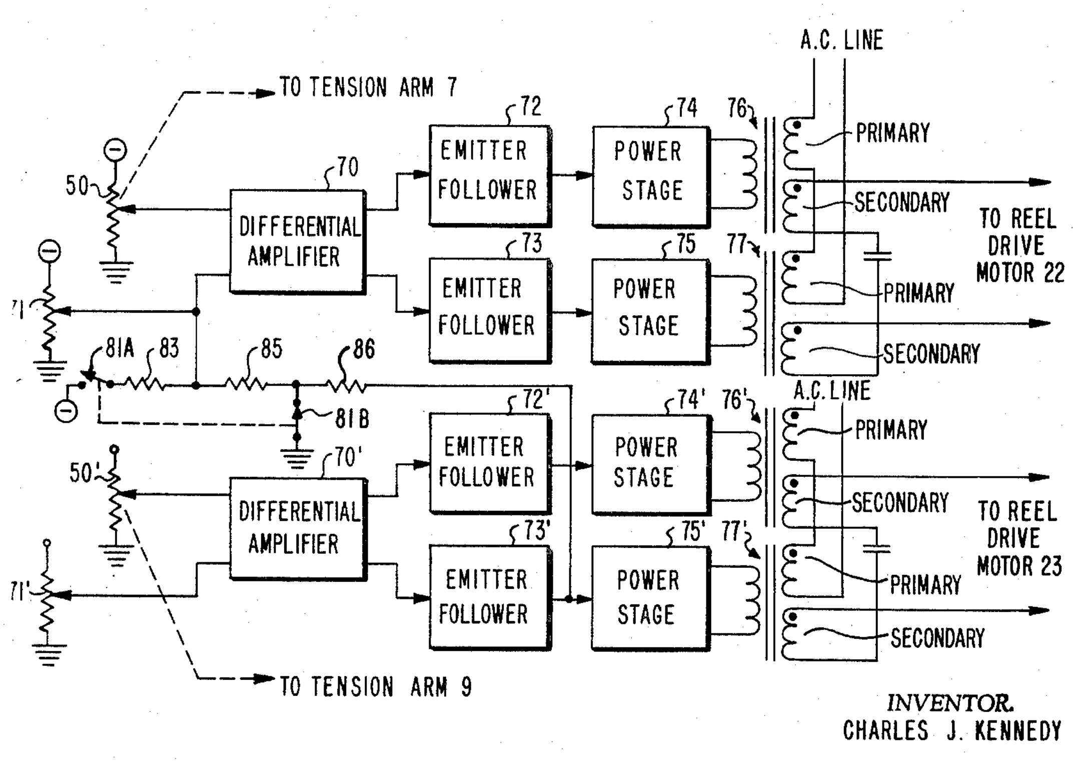
FIG. 7 is a simplified block diagram of a cross coupled servo system for use in the magnetic recorder of FIGS. 1 and 2.

The block diagram of FIG. 7 illustrates two servo systems which may be employed in the tape recorder of FIG. 1 for controlling the operation of the supply reel 1 and the takeup reel 2. The circuits of the two servo systems are substantially identical and like reference characters have been used throughout with a prime (′) being added to the designation of corresponding portions of the lower servo system associated with the tension arm 9. In any event, signals derived from the tension arm potentiometers 50 and 50′ are applied to differential amplifiers 70 and 70′ respectively. Each of the differential amplifiers 70, 70′ also receives a reference input signal which is predetermined by adjustment of a potentiometer 71, 71′. It will be recognized that each of these potentiometers may in an appropriate case comprise a pair of resistors connected in a voltage divider. The differential amplifiers 70, 70′ provide two separate outputs which are applied to emitter followers 72, 73, and 72′, 73′ respectively. The outputs from the emitter followers in turn are applied to the corresponding power stages 74, 75, 74′ and 75′. Each of the power stages is coupled to a control winding of the transformers 76, 77, 76′ and 77′. Each pair of transformers such as 76 and 77 is connected with their primary windings in series aiding across the A-C line while their 115 volt secondary windings are connected in series opposing and to a first winding of the associated servomotor. A second winding of the servomotor is connected directly across the A-C line as a phase reference. In response to an input signal, the power stage such as 74 serves as a variable resistance across the control winding of its associated transformer such as 76. If neither stage 74 nor 75 is conducting, the secondary voltages cancel and no voltage is applied to the servomotor winding. If stage 74 is conducting, less voltage is developed by transformer 76 and the resulting net secondary voltage causes the reel servomotor to rotate in a first direction. Alternatively, if the stage 75 conducts, less voltage is developed by the transformer 77 and a net secondary voltage of opposite phase causes the reel servomotor to rotate in the opposite direction. The servomotor is thus driven in a direction required to bring the tension arm (and thereby the potentiometer 50) back to null balance position. In this manner each servo amplifier provides an output signal which is of a reversible phase depending upon whether or not the tension arm is above or below its null balance position, and of a magnitude indicative of the extent of deviation from the null balance position. The reversible phase power signal is applied to the drive motors of the supply reels to restore the tension arms to the desired balance position.

Also included in FIG. 7 is a circuit for controlling the servo systems at relatively high speed in a rewind direction for fast rewind operation. As represented in FIG. 7, a switch 81A is shown coupled via a resistor 83 to the reference input of the differential amplifier 70. This switch may be operated in conjunction with the switch 48 of FIG. 6 in the rewind position and is mechanically coupled to a switch 81B which is also connected to the reference input of the amplifier 70 via a resistor 85. Closure of the switch 81 applies a potential to the lower input of the differential amplifiers 70 which disturbs the null balance potential distribution of the amplifier circuit and causes control signals to be developed which drive the supply reel drive motor 22 at maximum speed in the rewind direction. In accordance with the operation described above, the tension arm 9 controls the differential amplifier 70′ and the associated servo system coupled to the takeup reel drive motor 23 to follow the rotational speed of the supply reel drive motor 22 so the tape is rewound on the supply reel at a rapid rate. Generally when this operation is initiated, the supply reel is relatively empty of tape while the takeup reel is relatively full. However, as tape is transferred from the takeup reel to the supply reel, it builds up on the supply reel while being removed from the takeup reel to a point where the supply reel is driven faster than the servo system coupled to the takeup reel is able to follow. Were this condition permitted to continue, excessive tension might be developed in the tape which would either stretch or perhaps break the tape. In order to compensate for this effect, a connection is provided via a resistor 86 and the resistor 85 between the output of the emitter follower stage 73′ and the lower input of the differential amplifier 70. A positive voltage is developed at the output of the emitter follower 73′ when the takeup reel drive motor 23 is unable to keep up with the supply reel drive motor 22. This positive potential from the emitter follower 73′ applied to the lower input of the differential amplifier 70 serves to cause the supply reel drive motor 22 to slow down, thus preventing tape damage. In this fashion, the speed of the supply reel drive motor 22 is limited to the maximum rate at which tape is delivered from the takeup reel. This particular compensating circuit is disabled by the switch 81B which closes a shunt path during normal operation in the recording mode, but becomes operative when the switch 81B is opened as the switch 81A is closed to establish the rewind mode.

The various aspects in accordance with the present invention as shown and described hereinabove advantageously serve to provide an improved and effective incremental digital magnetic recorder which is arranged to advance a magnetic tape by predetermined increments in synchronism with asynchronously supplied input data for the recording thereof. The magnetic recorder is also arranged to drive the magnetic tape at high speed for predetermined intervals so as to define gaps between adjacent blocks of recorded data in a minimum time, thus minimizing the possibility of losing any of the input data which is desired to be recorded or, alternatively, minimizing the amount of auxiliary storage apparatus which is otherwise needed to temporarily record the data which is supplied during the gap-producing time interval. Servo systems of simple but effective design are included to control the rotation of the supply and takeup reels in accordance with the position of tape tension arms to maintain the tension on the tape uniform and within predetermined limits. Moreover, these servo systems are employed in the rewind mode to rewind the tape on the supply reel at a rapid rate and without producing excessive tension on the tape.

Although there has been shown and described above one particular arrangement of an incremental tape recorder in accordance with the invention, this has been for purposes of illustration only and it will be understood that the invention is not limited thereto. Accordingly, any and all modifications, variations, or equivalent arrangements falling within the scope of the annexed claims should be considered to be a part of the invention.

What is claimed is:

1. A magnetic tape recorder for recording blocks of digital information on a magnetic recording tape bit by bit in a plurality of parallel tracks, said blocks each containing a predetermined number of binary bit positions, including the combination of a stepping motor, a capstan driven by said stepping motor, a pinch roller mechanism adapted to be selectively energized to engage the magnetic recording tape with said stepping motor capstan for transporting said tape past the magnetic recording head bit position by bit position in synchronism with signals applied to said magnetic recording head, a continuously rotating drive motor, a capstan driven by said continuously rotating drive motor, a second pinch roller mechanism and means for selectively engaging said second pinch roller mechanism with said continuously rotating capstan to selectively transport said magnetic recording tape for a predetermined distance past the magnetic recording head, whereby a gap is introduced between blocks of digital information recorded on said magnetic recording tapes.

2. In a magnetic tape recorder for recording blocks of digital information along a magnetic recording tape, the combination of a magnetic recording head, a stepping motor, a capstan driven by said stepping motor, a pinch roller positioned adjacent said stepping motor capstan for selectively engaging said magnetic recording tape to transport said tape past the magnetic recording head bit position by bit position in synchronism with signals applied to said magnetic recording head, a continuously rotating capstan, a second pinch roller positioned adjacent said continuously rotating capstan, and means for selectively engaging said second pinch roller with said continuously rotating capstan while disengaging the tape from said stepping motor capstan to draw a predetermined length of said magnetic recording tape past said magnetic recording head thereby introducing a gap into the pattern of magnetic recording on said magnetic recording tape between blocks of digital information.

3. A magnetic tape recording system for recording digital data in a standard computer compatible format including a plurality of character frames having a standard bit density and disposed in a block, with adjacent blocks being separated by a selected standard inter-record gap distance, the system comprising an incremental drive capstan in continuous engagement with the tape, drive means responsive to separate data characters to be recorded for actuating the incremental drive capstan one step at a time for each frame of data, first pinch roller means for engaging the tape to the incremental drive capstan, a continuously rotating capstan in continuous engagement with the tape, second pinch roller means disposed on the opposite side of the tape from the continuously rotating capstan, and means responsive to the completion of a block of data on the tape for engaging the second pinch roller to the continuously rotating capstan for a predetermined time interval while concurrently disengaging the first pinch roller means.

4. A system for recording and reproducing digital data from a magnetic tape comprising tape supply and takeup means, magnetic recording and reproducing means disposed adjacent the tape, means responsive to data supplied to the recording and reproducing means for providing minor digital characters each having a number of parallel minor digits, a first incrementally movable capstan disposed along the tape path between the tape takeup and supply means, a second continuously rotating capstan mounted along the tape path spaced apart from the first capstan between the tape takeup and supply means, first pinch roller means selectively engaging the tape to the first capstan, second pinch roller means selectively engaging the tape to the second capstan, means responsive to data to be recorded for selectively advancing the first capstan in synchronism therewith, means responsive to an asynchronous mode of operation for selectively engaging the second pinch roller means to the second capstan while concurrently disengaging the first pinch roller means from the first capstan, and means responsive to program command signals for operating the second pinch roller means in a timed relation to the first pinch roller means to provide a combination of incremental and continuous motion to insert a gap of a selected length in the recorded material.

5. In a magnetic tape recorder, the combination of a tape supply reel, a tape takeup reel, a magnetic recording tape passing between said supply reel and said takeup reel, a first tension arm positioned adjacent the supply reel, a second tension arm positioned adjacent said takeup reel, said magnetic recording tape passing over said first and second tension arms so as to maintain the tape in a predetermined condition to tension between said tension arms, a magnetic recording head positioned adjacent the tape between the tension arms, an incremental drive capstan positioned along the path of said tape between said tension arms, a first pinch roller positioned adjacent the incremental drive capstan for selectively engaging the magnetic recording tape with the capstan for transporting the magnetic recording tape past the magnetic recording head step by step, a continuously rotating capstan positioned along the path of the tape between the tension arms, a second pinch roller positioned adjacent the continuously rotating capstan, means for selectively engaging the second pinch roller with the continuously rotating capstan for rapidly drawing a predetermined length of said magnetic recording tape past the magnetic recording head to introduce gaps between blocks of digital information being recorded on said magnetic recording tape, a first servo system connected between the first tension arm and the supply reel for controlling said supply reel to maintain said tension arm in a predetermined position and a second servo system connected between the second tension arm and the takeup reel for maintaining the second tension arm in a predetermined position, whereby said tension arms are deflected to supply the tape required to pass a section of the tape past the magnetic recording head upon actuation of the second pinch roller to engage the tape with the continuously rotating capstan with the servo system operating to return the tension arms to their balanced position for a subsequent recording of a block of digital information in step-by-step increments when the first pinch roller engages the incremental drive capstan.

6. In a magnetic tape recorder in accordance with claim 5, means for interconnecting the first and second pinch roller engaging means so as to enable the second pinch roller to engage the tape with the continuously rotating capstan only upon release of the tape from engagement with the incremental drive capstan by the first pinch roller.

7. In a magnetic tape recorder as set forth in claim 5, means for reversing the operation of said first and second servo systems so as to rewind the tape from the takeup reel to the supply reel, and a cross coupling between said second servo system and said first servo system for controlling the relative rotational speeds of said supply and takeup reels to maintain a proper tension in the magnetic recording tape during the rewind operation.

8. The invention as set forth in claim 5 wherein said first and second servo systems each comprise a pair of signal channels each coupled to a control winding of a transformer, each transformer having in addition a primary and a secondary winding, a servomotor having a pair of windings, means intercoupling the primary windings of the transformers of the pair of channels in series aiding across an alternating current power source, means connecting a first winding of the servomotor across said power source, means connecting the secondary windings of the two transformers in series opposing and to another winding of said servomotor, and means for adjusting the relative currents in the two control windings in response to signals along said signal channels to determine the phase and magnitude of an alternating voltage applied to the servomotor from the transformer secondary windings.

References Cited

UNITED STATES PATENTS

| | | | |
|---|---|---|---|
| 3,319,237 | 5/1967 | Jones | 340—174.1 |
| 3,145,373 | 8/1964 | Willard | 226—42 |

BERNARD KONICK, *Primary Examiner.*

A. I. NEUSTADT, *Assistant Examiner.*